US012373360B2

(12) United States Patent
Srinivasan et al.

(10) Patent No.: US 12,373,360 B2
(45) Date of Patent: Jul. 29, 2025

(54) INTEGRATED CIRCUIT TRANSACTION REDUNDANCY

(71) Applicant: XILINX, INC., San Jose, CA (US)

(72) Inventors: Krishnan Srinivasan, San Jose, CA (US); Ygal Arbel, Morgan Hill, CA (US); Sagheer Ahmad, Cupertino, CA (US); Sarosh I. Azad, Fremont, CA (US); Pramod Bhardwaj, San Jose, CA (US); Yanran Chen, San Jose, CA (US); James Murray, Los Gatos, CA (US)

(73) Assignee: XILINX, INC., San Jose, CA (US)

( * ) Notice: Subject to any disclaimer, the term of this patent is extended or adjusted under 35 U.S.C. 154(b) by 390 days.

(21) Appl. No.: 17/957,418

(22) Filed: Sep. 30, 2022

(65) Prior Publication Data

US 2024/0111693 A1    Apr. 4, 2024

(51) Int. Cl.
*G06F 13/16*    (2006.01)
*G06F 11/07*    (2006.01)

(52) U.S. Cl.
CPC ...... *G06F 13/1631* (2013.01); *G06F 11/0772* (2013.01); *G06F 13/1668* (2013.01)

(58) Field of Classification Search
None
See application file for complete search history.

(56) References Cited

U.S. PATENT DOCUMENTS

| 10,025,716 | B2 * | 7/2018 | Gostin | G06F 12/10 |
| 11,281,810 | B1 * | 3/2022 | Swarbrick | G06F 21/85 |
| 2014/0012904 | A1 * | 1/2014 | Duncan | G06F 15/17 |
| | | | | 709/204 |

* cited by examiner

*Primary Examiner* — Edward J Dudek, Jr.
*Assistant Examiner* — Ralph A Verderamo, III
(74) *Attorney, Agent, or Firm* — Patterson + Sheridan, LLP

(57) ABSTRACT

Techniques to provide transaction redundancy in an IC include receiving an original memory access request directed to a first memory aperture, constructing a redundant memory access directed to a second memory aperture, and selectively returning a response of the first or second memory aperture to an originator based on contents of the responses. For a write operation, if acknowledgement indicators of the responses indicate success, a response is returned to the originator. For a read operation, if acknowledgement indicators of the responses indicate success and data returned in the response match one another, a response is returned to the originator. If the acknowledgement indicators indicate success, but the data does not match, a retry of the original and redundant read requests is initiated. If any of the acknowledgement indicators do not indicate success, an error is declared. In a mixed-criticality embodiment, the redundant memory access request may be constructed selectively.

20 Claims, 10 Drawing Sheets

| | Original ID 906 | Redundant ID 908 | Data Fields 910 | V | C |
|---|---|---|---|---|---|
| 902 { | Original ID 906 | Redundant ID 908 | | 0 | 1 |
| 904 { | | | | 0 | 0 |

FIG. 9A

| | Original ID 906 | Redundant ID 908 | Data Fields 910 | V | C |
|---|---|---|---|---|---|
| 902 { | Original ID 906 | Redundant ID 908 | A0 Data | 1 | 1 |
| 904 { | | | | 0 | 0 |

FIG. 9B

| | Original ID 906 | Redundant ID 908 | Data Fields 910 | V | C |
|---|---|---|---|---|---|
| 902 { | Original ID 906 | Redundant ID 908 | A0 Data | 1 | 1 |
| 904 { | | | A1 Data | 1 | 0 |

FIG. 9C

| | Original ID 906 | Redundant ID 908 | Data Fields 910 | V | C |
|---|---|---|---|---|---|
| 902 { | Original ID 906 | Redundant ID 908 | A0 and B0 Data | 1 | 0 |
| 904 { | | | A1 Data | 1 | 1 |

FIG. 9D

| | Original ID 906 | Redundant ID 908 | Data Fields 910 | V | C |
|---|---|---|---|---|---|
| 902 { | Original ID 906 | Redundant ID 908 | A0 and A1 Data | 1 | 0 |
| 904 { | | | B0 and B1 Data | 1 | 0 |

FIG. 9E

INTEGRATED CIRCUIT TRANSACTION REDUNDANCY

TECHNICAL FIELD

Examples of the present disclosure generally relate to providing transaction redundancy in integrated circuits.

BACKGROUND

Systems-on-Chip (SoC) that are used in some markets, such as automotive markets, need enhanced safety mechanisms to ensure fail safe operation or a graceful recovery from failure. For such use-cases, SoCs may be required to support high-level functional safety (FuSa), which may be based on an Automotive Safety Integrity Level (ASIL) risk classification scheme defined by the International Organization for Standardization (ISO), based in Geneva, Switzerland, under ISO 26262, titled "Functional Safety for Road Vehicles standard."

Safety standards, such as ASIL-D, may be achieved with hardware mechanisms, such as lockstep hardware, or by protecting a data path with error correction codes, or by providing redundant paths for system-level communications. These approaches are not suitable for memory subsystem safety. Further, these methodologies don't support mixed criticality assurance in which a SoC provides a higher level of assurance to highly critical components/subsystems, and a lower level of assurance to less critical components/subsystems.

SUMMARY

Techniques for transaction redundancy for integrated circuitry are described. One example described herein is an integrated circuit (IC) system that includes transaction redundancy circuitry that receives a first memory access request from an originator circuit, where a destination address of the first memory access request corresponds to a first memory aperture, constructs a second memory access request that is redundant to the first memory access request, provides the second memory access request with a destination address of a second memory aperture, receives responses to the first and second memory access requests from the respective first and second memory apertures, and selectively returns one or more of the responses to the originator circuit based on contents of the responses.

Another example described herein is a system-on-a-chip (SoC) that includes first and second memory apertures, an originator circuit configured to generate a first memory access request, wherein a destination address of the first memory access request corresponds to the first memory aperture, interconnection circuitry configured to interface between the originator circuit and each of the first and second memory apertures, and transaction redundancy circuitry configured to construct a second memory access request that is redundant to the first memory access request, and provide the second memory access request with a destination address of a second memory aperture, receive responses to the first and second memory access requests from the respective first and second memory apertures, and selectively return one or more of the responses to the originator circuit based on contents of the responses.

Another example described herein is method that includes receiving a first memory access request from an originator circuit, wherein a destination address of the first memory access request corresponds to a first memory aperture, constructing a second memory access request that is redundant to the first memory access request, and providing the second memory access request with a destination address of a second memory aperture, receiving responses to the first and second memory access requests from the respective first and second memory apertures, and selectively returning one or more of the responses to the originator circuit based on contents of the responses.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIGS. 9A-9E are conceptual illustrations of contents of a read response buffer as responses to competing read and write requests are received, according to an embodiment.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
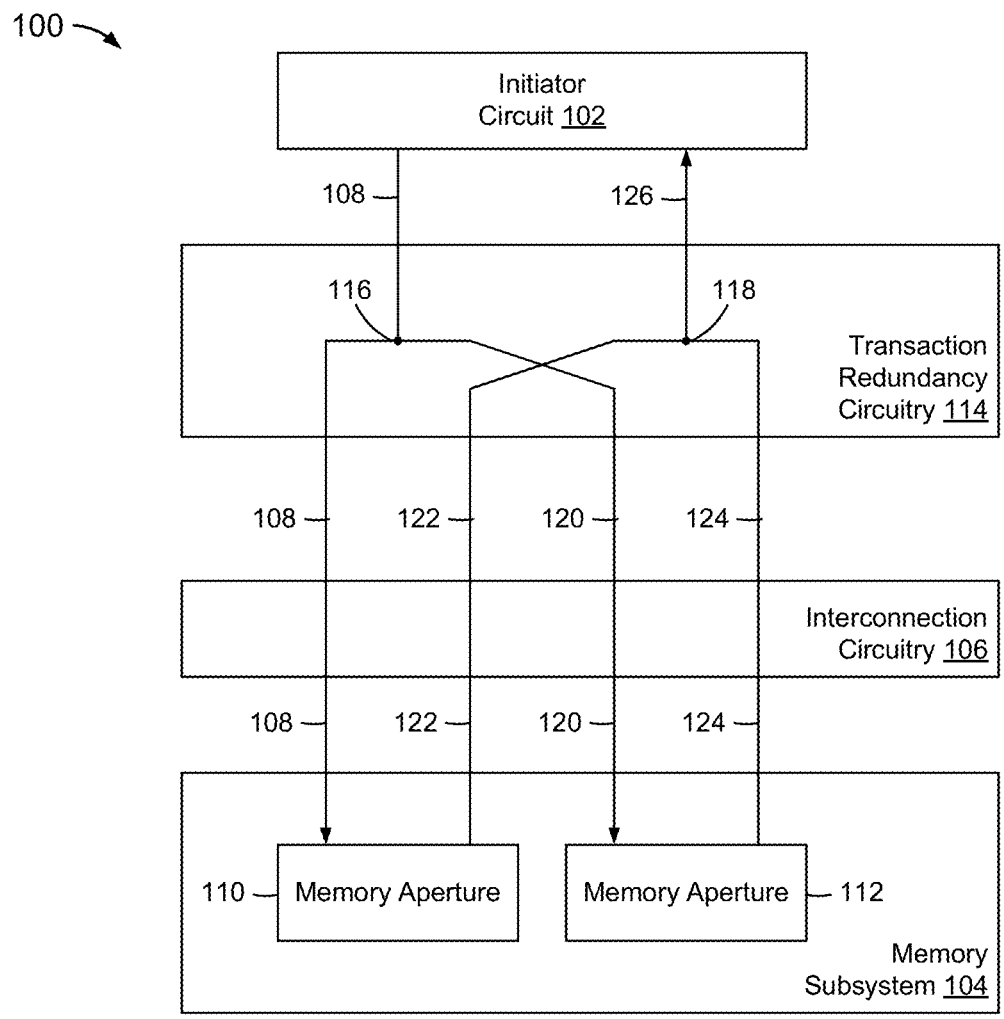
FIG. 1 is a block diagram of an integrated circuit (IC) system that includes an originator circuit that initiates memory access requests, and transaction redundancy unit (TRU), illustrated here as transaction redundancy circuitry, according to an embodiment.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe transaction redundancy techniques for integrated circuitry. Examples are provided herein with respect to memory access transactions (e.g., memory read and/or write transactions). Transaction redundancy techniques disclosed herein are not, however, limited to memory access transactions.

Embodiments herein may be applied to new and/or existing devices.

Embodiments herein may be useful to perform localized high-level safety integrity protection and/or system-level integrity protection.

Embodiments herein may be used to provide a mixed-criticality environment. A mixed-criticality environment may be useful to minimize overhead by applying transaction redundancy only to a subset of components/subsystems (e.g., safety critical transactions).

Embodiments herein may be useful to ensure data consistency

FIG. 1 is a block diagram of an integrated circuit (IC) system 100 that includes a transaction redundancy unit (TRU), illustrated here as transaction redundancy circuitry 114, according to an embodiment. IC system 100 further includes a transaction originator circuit (originator circuit) 102, a memory subsystem 104, and interconnection circuitry 106 that interfaces between originator circuit 102 and memory subsystem 104.

IC system 100 may include and/or represent one or more IC devices (e.g., dies or packages), and may be part of a system-on-a-chip (SoC). For example, and without limitation, originator circuit 102, memory subsystem 104, interconnection circuitry 106, and transaction redundancy circuitry 114 may reside on a single IC device or may be distributed amongst multiple IC devices.

Transaction redundancy circuitry 114 provides safety by issuing redundant transactions to different regions of memory subsystem 104, to distribute duplicate copies of data across IC system 100. In other words, a memory read operation involves reading multiple copies of data, and a memory write operation involves writing multiple copies of data.

In the example of FIG. 1, memory subsystem 104 includes memory apertures 110 and 112, respectively. Memory apertures 110 and 112 may represent respective blocks of memory or ranges of memory addresses. Memory apertures 110 and 112 may be physically spaced apart from one another within IC system 100. Memory apertures 110 and 112 may be referred to herein and first and second memory apertures 110 and 112, respectively.

Interconnection circuitry 106 may include, without limitation buffers, an on-chip packet-switched network or network-on-a-chip (NoC), and/or AXI interface circuitry.

Transaction redundancy circuitry 114 includes redundant transaction generator circuitry 116 and redundant transaction management circuitry 118. In the example of FIG. 1, transaction redundancy circuitry 114 and interconnection circuitry 106 are illustrated as separate blocks of circuitry. In an embodiment, interconnection circuitry 106 performs one or more features described herein with respect to transaction redundancy circuitry 114, and/or transaction redundancy circuitry 114 performs one or more features described herein with respect to interconnection circuitry 106.

Figure 2:
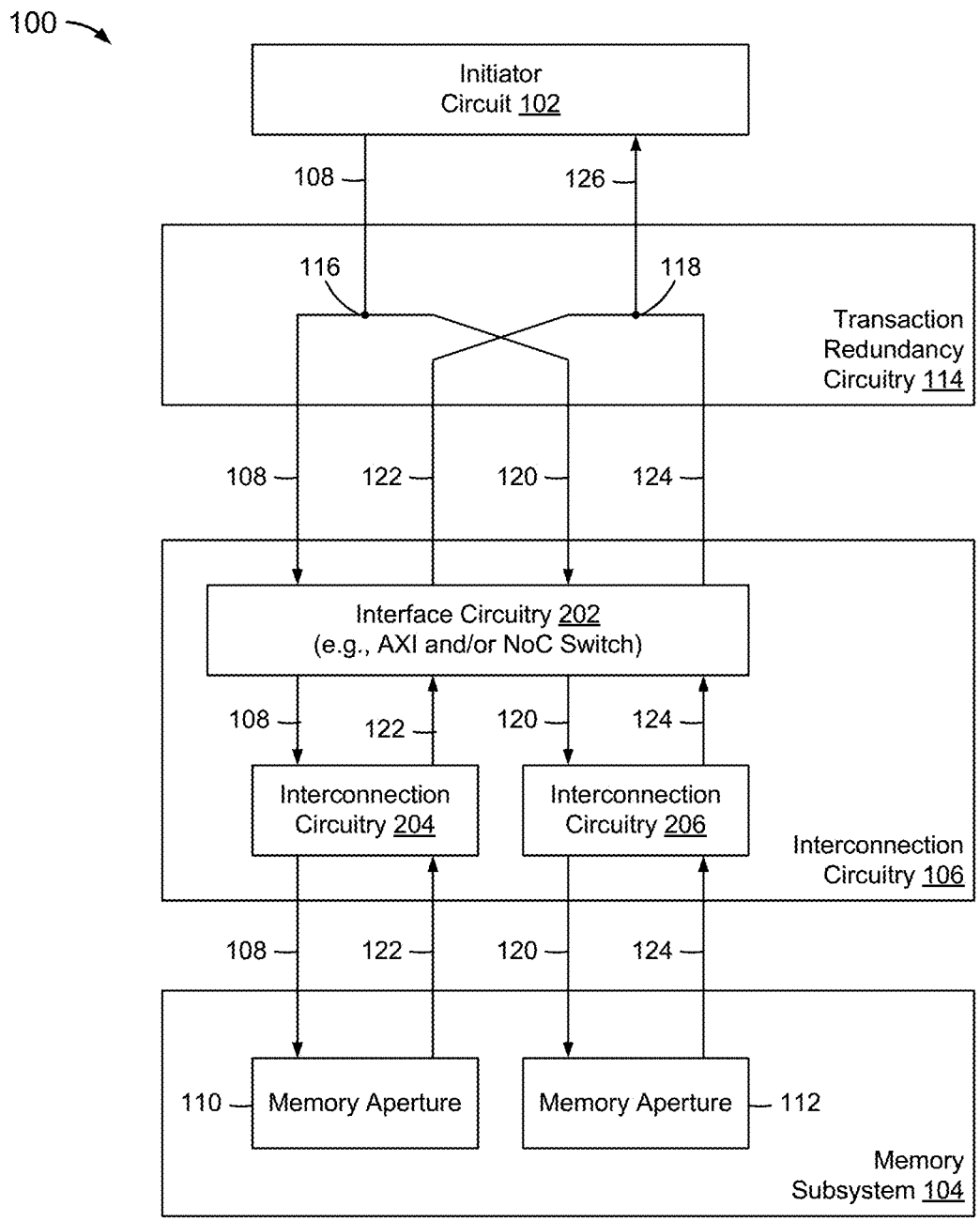
FIG. 2 is a more detailed block diagram of the IC system, according to an embodiment.

FIG. 2 is a more detailed block diagram of IC system 100, according to an embodiment. In FIG. 2, interconnection circuitry 106 includes interface circuitry 202 that interfaces with originator circuit 102. Interface circuitry 202 may include, without limitation, AXI interface circuitry and/or a NoC switch. Interconnection circuitry 106 further includes interconnection circuitry 204 and 206 that provide paths between interface circuitry 202 and memory apertures 110 and 112, respectively. Interconnection circuitry 204 and 206 may include, without limitation, respective NoC components and/or buffers/drivers. The example of FIG. 2 may represent an embodiment in which memory apertures 110 and 112 are spaced apart from one another within IC system 100.

In an embodiment, memory apertures 110 and 112 may be positioned, selected, or configured so that they do not have few or no overlapping or shared NoC components. In other words, IC system 100 may be designed or configured so that memory apertures 110 and 112 are as distant from one another as possible.

Operation of IC system 100 is described below with reference to FIG. 3.

Figure 3:
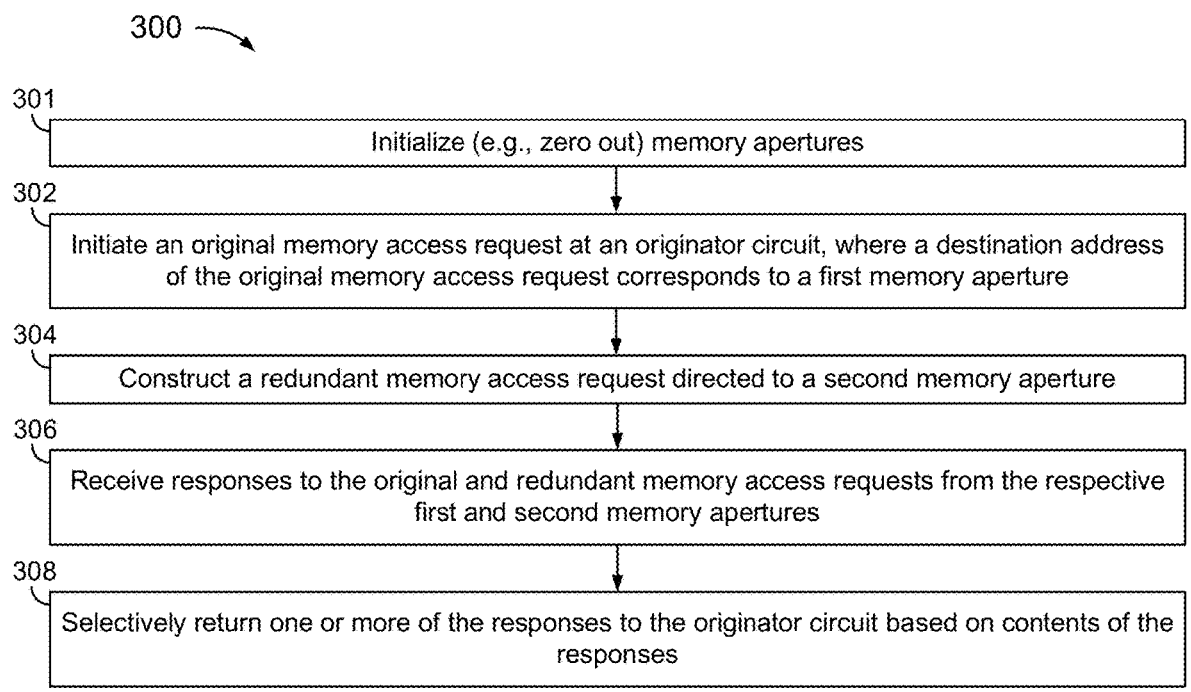
FIG. 3 is a flowchart of a method of providing transaction redundancy, according to an embodiment.

FIG. 3 is a flowchart of a method 300 of providing transaction redundancy, according to an embodiment. Method 300 is described below with reference to IC system 100. Method 300 is not, however, limited to the example of IC system 100.

At 301 memory subsystem 104 initializes memory apertures 110 and 112, so that contents of memory aperture 110 are identical to contents of memory aperture 112. Memory subsystem 104 may initialize memory apertures to contain all zeros or all ones. Initialization of memory apertures 110 and 112 at 301 may be useful to insure data consistency between memory apertures 110 and 112, from the outset.

At 302, originator circuit 102 initiates a memory access request 108 directed to memory aperture 110 (i.e., a destination address of memory access request 108 falls within or corresponds to memory aperture 110). Memory access request 108 may include a read request and/or a write request. Memory access request 108 may also referred to herein as first memory access request 108 and/or original memory access request 108.

At 304, redundant transaction generator circuitry 116 constructs a memory access request 120 that is redundant to original memory access request 108, and provides memory access request 120 with a destination address of memory aperture 112. Memory access request 120 may also be referred to herein as second memory access request 120 and/or redundant memory access request 120.

Redundant transaction generator circuitry 116 may assign an identifier (ID) to original memory access request 108 and redundant memory access request 120. Alternatively, interface circuitry 202 and/or other circuitry assigns an identifier to original memory access request 108 (e.g., a system management identifier (SMID) or an ACID), and redundant transaction generator circuitry 116 assigns an ID to redundant memory access request 120 based on the identifier of original memory access request 108. Redundant transaction generator circuitry 116 may, for example, add a bit to the identifier of original memory access request 108 to provide the ID for redundant memory access request 120. The added bit may be introduced as a most significant bit of ID of original memory access request 108. A SMID may be programmed across all duplicate transactions across all splitters. The SMID may also be used to ensure that the memory region used for redundant transactions (e.g., memory aperture 112) is only accessible to transactions with an appropriate SMID.

In FIG. 2, original memory access request 108 passes through interface circuitry 202 and interconnection circuitry 204 to reach memory aperture 110, and redundant memory access request 120 passes through interface circuitry 202 and interconnection circuitry 206 to reach memory aperture 112.

At 306, redundant transaction management circuitry 118 receives a response 122 to original memory access request 108 and a response 124 to redundant memory access request 120, from memory subsystem 104. In an embodiment, responses 122 and 124 include respective acknowledgement indicators that indicate whether memory access requests 108 and 120 completed successfully.

For example, where memory access requests 108 and 120 include write requests, responses 122 and 124 may include write acknowledgement indicators.

As another example, where memory access request 108 includes a read request, responses 122 and 124 may include read acknowledgement indicators and data read from memory apertures 110 and 112.

At 308, redundant transaction management circuitry 118 selectively returns response 122 and/or response 124 to originator circuit 102 as a response 126. For example, if the acknowledgement indicators of responses 122 and 124 indicate that memory access requests 108 and 120 completed successfully, redundant transaction management circuitry 118 may return response 122 and/or response 124 to originator circuit 102. If the acknowledgement indicator of response 122 and/or response 124 indicates that the respective memory access request was unsuccessful, redundant transaction management circuitry 118 may generate an error indication, which may include an interrupt and/or other control signal.

In an embodiment, transaction redundancy circuitry 114 further includes circuitry that compares the data sets contained in read responses, and retries memory access requests 108 and 120 if the data sets differ from one another. Examples are provided below with reference to FIGS. 4-6.

Figure 4:
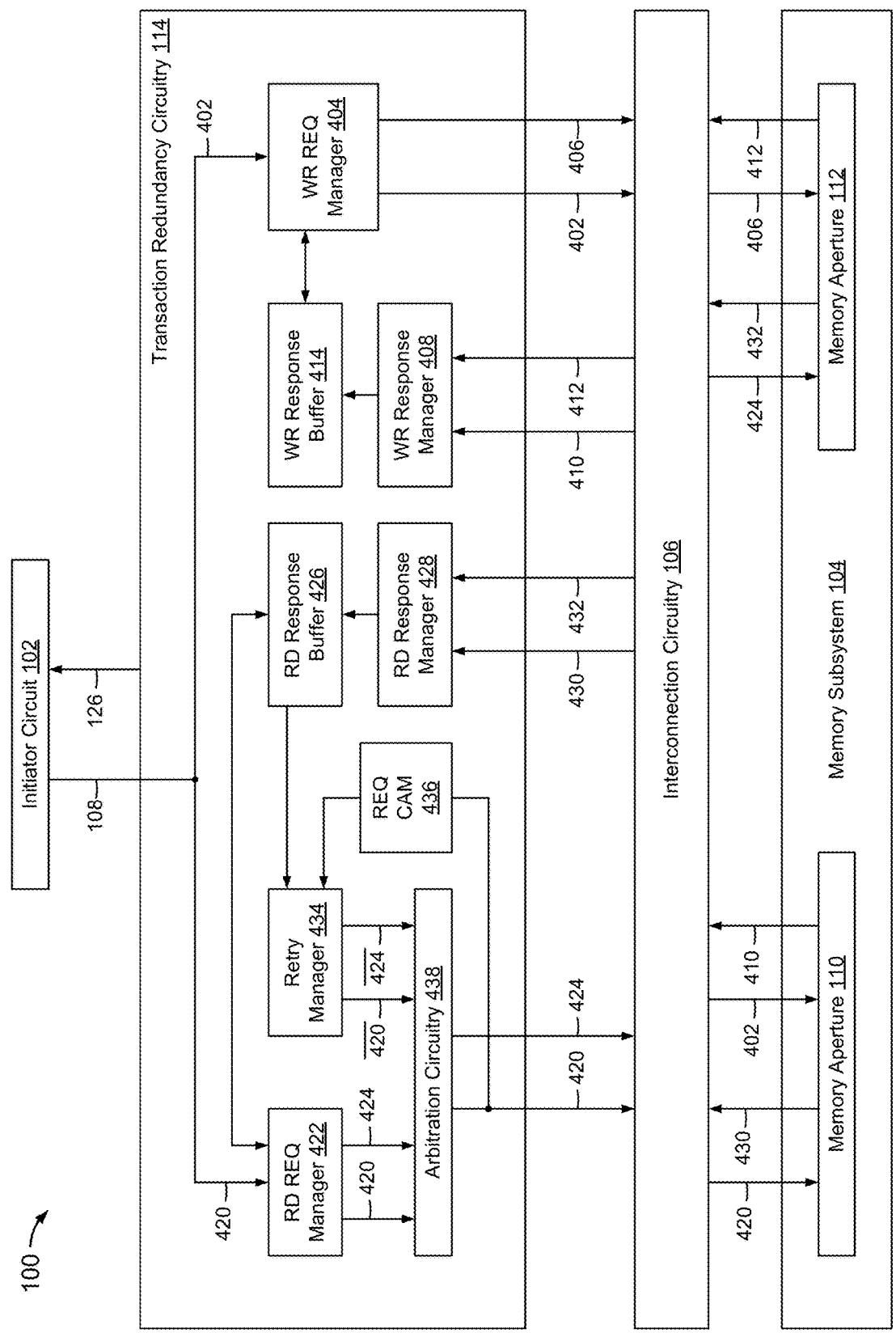
FIG. 4 is a block diagram of the IC system, including example features of the transaction redundancy circuitry, according to an embodiment.

FIG. 4 is a block diagram of IC system 100 including example features of transaction redundancy circuitry 114, according to an embodiment. In the example of FIG. 4, transaction redundancy circuitry 114 includes separate write circuitry and read circuitry. FIG. 4 is described below in conjunction with FIGS. 5 and 6.

Figure 5:
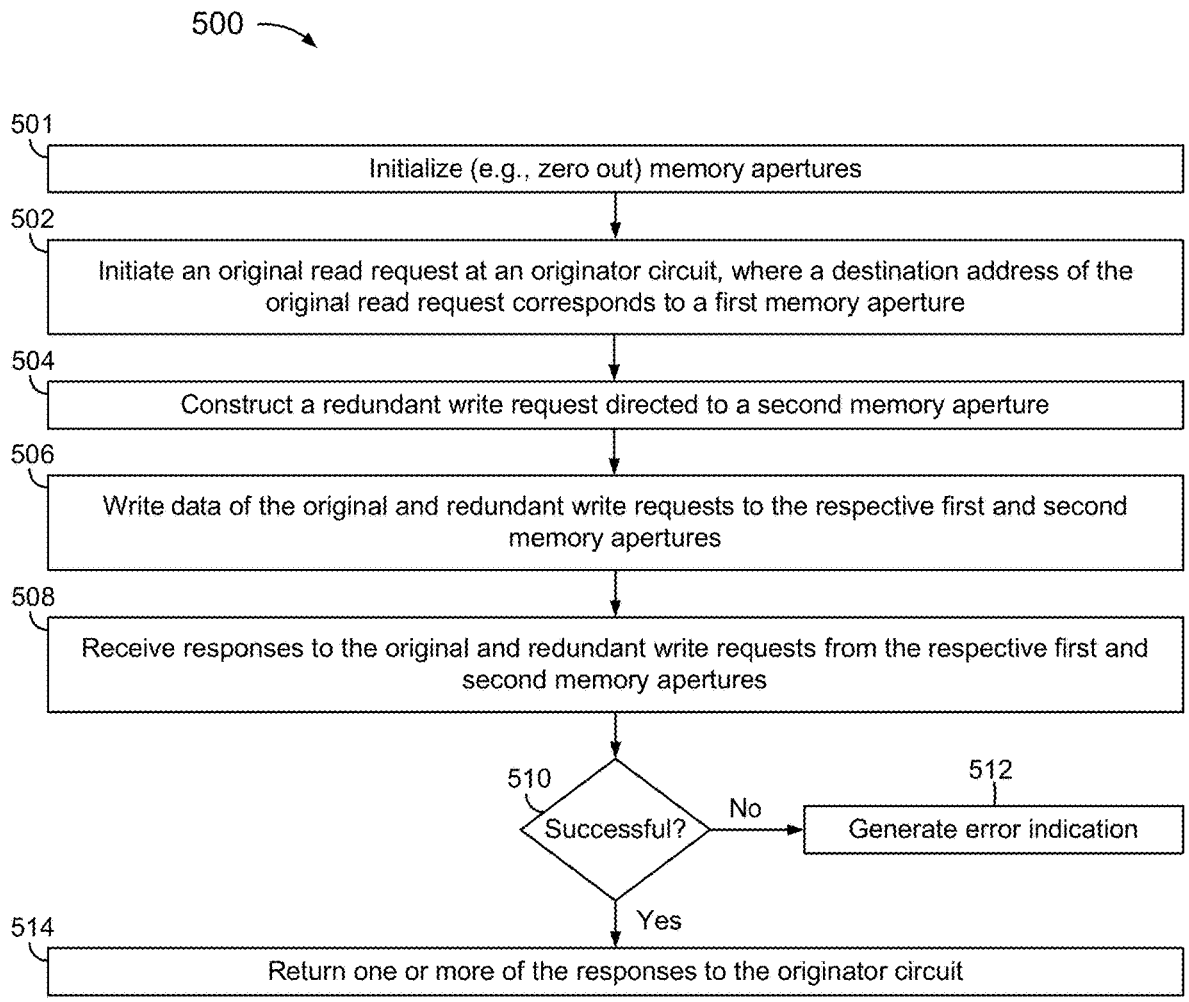
FIG. 5 is a flowchart of a method of providing transaction redundancy to a write request, according to an embodiment.

FIG. 5 is a flowchart of a method 500 of providing transaction redundancy to a write request, according to an embodiment. Method 500 is described below with reference to IC system 100 as illustrated in FIG. 4. Method 500 is not, however, limited to the example of FIG. 4.

At 501, memory subsystem 104 initializes memory apertures 110 and 112, so that contents of memory aperture 110 are identical to contents of memory aperture 112.

At 502, originator circuit 102 initiates original memory access request 108 directed to memory aperture 110. In this example, original memory access request 108 includes an original write request 402 (FIG. 4).

At 504, a write request (WR REQ) manager 404 constructs a write request 406 that is redundant to original write request 402, and provides redundant write request 406 with a destination address of memory aperture 112. WR REQ manager 404 may assign identifiers to original and redundant write requests 402 and 406, such as described in one or more examples herein. WR REQ manager 404 may provide the identifiers to a WR response buffer 414.

At 506, memory subsystem 104 writes data of original and redundant write requests 402 and 406 to memory apertures 110 and 112, respectively.

At 508, a WR response manager 408 receives a response 410 to original write request 402 and a response 412 to redundant write request 406, from memory subsystem 104, and stores the responses in WR response buffer 414. In an embodiment, responses 410 and 412 include respective acknowledgement indicators that indicate whether write requests 402 and 406 completed successfully. Responses 410 and 412 may further include the identifiers assigned at 504.

WR response manager 408 may receive and store one of responses 410 and 412 while it waits for the arrival of the other one of responses 410 and 412. WR response manager 408 may rely on the identifiers provided to WR response buffer 414 by WR REQ manager 404 at 504, and the identifiers contained in responses 410 and 412, to pair responses 410 and 412 with one another.

At 510, WR response manager 408 determines whether write acknowledgement indicators within responses 410 and 412 indicate that write requests 402 and 406 completed successfully.

At 512, if original write request 402 and/or redundant write request 406 is unsuccessful, WR response manager 408 generates an error indication, such as an interrupt and/or other control signal.

At 514, if write requests 402 and 406 completed successfully, WR response manager 408 forwards response 410 and/or response 412 to originator circuit 102.

Figure 6:
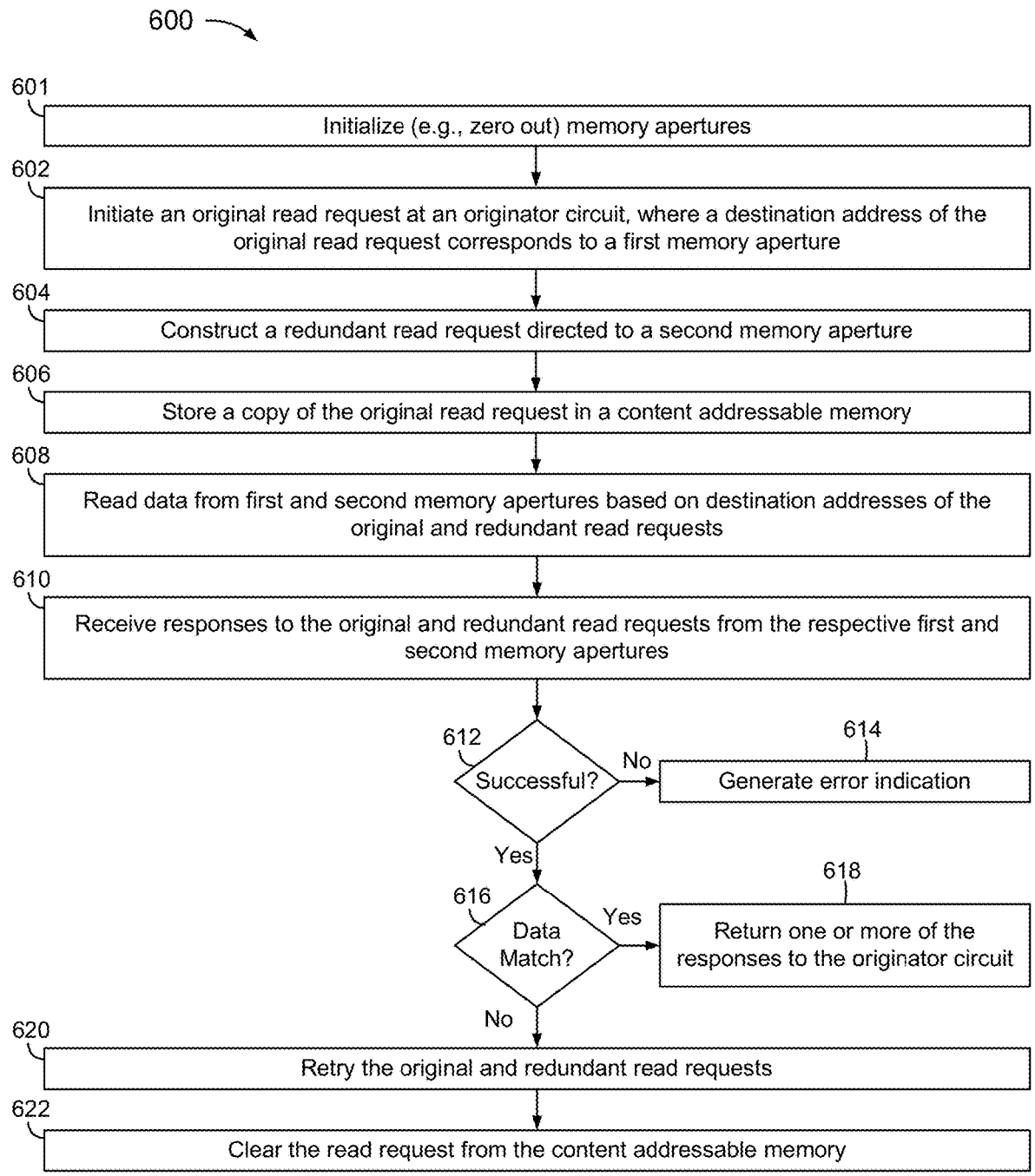
FIG. 6 is a flowchart of a method 600 of providing transaction redundancy to a read request, according to an embodiment.

FIG. 6 is a flowchart of a method 600 of providing transaction redundancy to a read request, according to an embodiment. Method 600 is described below with reference to IC system 100 as illustrated in FIG. 4. Method 600 is not, however, limited to the example of FIG. 4.

At 601, memory subsystem 104 initializes memory apertures 110 and 112, so that contents of memory aperture 110 are identical to contents of memory aperture 112.

At 602, originator circuit 102 initiates original memory access request 108 directed to memory aperture 110. In this example, original memory access request 108 includes an original read request 420 (FIG. 4).

At 604, a read request (RD REQ) manager 422 constructs a read request 424 that is redundant to first read request 420, and provides redundant read request 424 with a destination address of memory aperture 112. RD REQ manager 422 may assign identifiers to read requests 420 and 424, such as described in one or more examples herein. RD REQ manager 422 may provide the identifiers to a RD response buffer 426.

At 606, a content addressable memory (REQ CAM) 436 stores a copy of original read request 420, indexed by the identifier assigned to original read request 420 at 604. REQ CAM 436 may store the entire payload of original read request 420. The copy of original read request 420 may be used for a retry, such as described below with respect to 620.

At 608, memory subsystem 104 reads data from memory apertures 110 and 112 based on destination addresses of read requests 420 and 424, respectively.

At 610, a RD response manager 428 receives a response 430 to original read request 420 and a response 432 to redundant read request 424, from memory subsystem 104, and stores the responses in RD response buffer 426. In an embodiment, responses 430 and 432 include respective acknowledgement indicators that indicate whether read requests 420 and 424 completed successfully. Responses 430 and 432 may further include the respective data read at 606. Responses 430 and 432 may further include the identifiers assigned at 604.

RD response manager 428 may receive and store one of responses 430 and 432 while it waits for the arrival of the other one of responses 430 and 432. RD response manager 428 may rely on the identifiers provided to RD response buffer 426 by RD REQ manager 422 at 604, and the identifiers contained in responses 430 and 432, to pair responses 430 and 432 with one another.

At 612, RD response manager 428 determines whether read acknowledgement indicators within responses 430 and 432 indicate that read requests 420 and 424 completed successfully.

At 614, if original read request 420 and/or redundant read request 424 is unsuccessful, RD response manager 428 generates an error indication, such as an interrupt and/or other control signal.

At 616, RD response manager 428 determines whether data returned with responses 430 and 432 match one another.

At 618, if the data returned within responses 430 and 432 match one another, RD response manager 428 forwards response 430 and/or response 432 to originator circuit 102.

At 620, if the data returned within responses 430 and 432 does not match one another, a retry manager 434 may initiate a retry of read requests 420 and 424 based on the copy of original read request 420 stored in REQ CAM 436 at 606, illustrated in FIG. 4 as retry read requests $\overline{420}$ and $\overline{424}$, respectively.

Arbitration circuitry 438 may arbitrate between retry read requests $\overline{420}$ and $\overline{424}$ and a subsequent read request from originator circuit 102. Arbitration circuitry 438 may use a round robin arbitration scheme. If only one request is present, the request wins arbitration by default.

Retry read requests $\overline{420}$ and $\overline{424}$ may be processed as described above with respect original and redundant read requests 420 and 424. If the retry operation is unsuccessful, retry manager 434 may generate an error indication.

At 622, REQ CAM 436 clears read request 420.

In FIG. 4, WR REQ manager 404, RD REQ manager 422, and arbitration circuitry 438 may correspond to redundant transaction generator circuitry 116 in FIG. 1. Other features of transaction redundancy circuitry 114 illustrated in FIG. 4 may correspond to redundant transaction management circuitry 118 in FIG. 1

Retry manager 434 may be useful to accommodate a data consistency issue, such as a race condition, which may arise, for example, when multiple originator circuits have access to memory apertures 110 and 112. Retry manager 434 may accommodate a data consistency issue as described below with reference to FIGS. 7 and 8.

Figure 7:
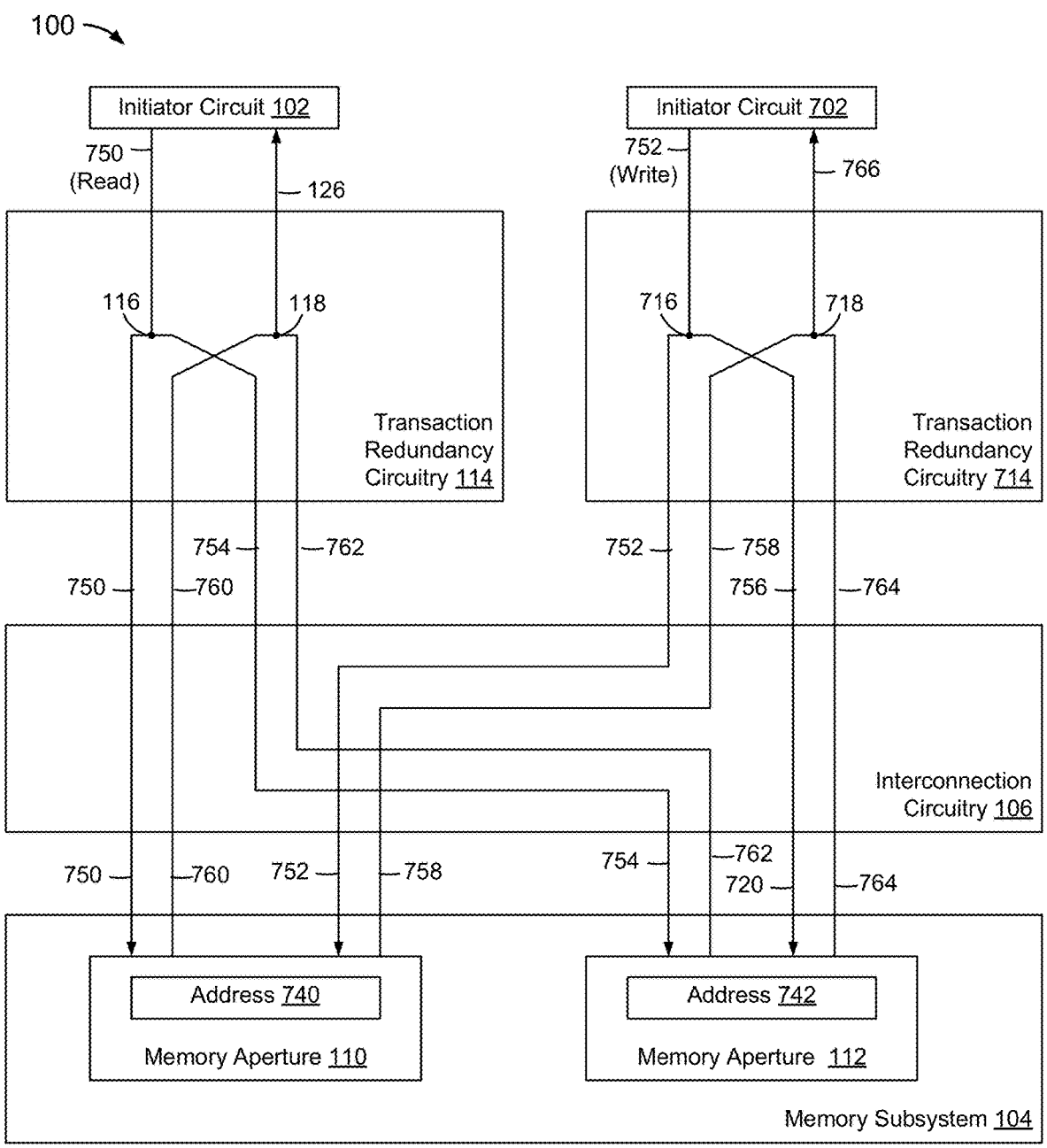
FIG. 7 is a block diagram of the IC system, further including a second originator circuit and corresponding transaction redundancy circuitry, according to an embodiment.

FIG. 7 is a block diagram of IC system 100, further including an additional originator circuit 702 and corresponding transaction redundancy circuitry 714, according to an embodiment. Transaction redundancy circuitry 714 includes redundant transaction generator circuitry 716 and redundant transaction management circuitry 718. In FIG. 7, memory apertures 110 and 112 include respective addresses 740 and 742.

Figure 8:
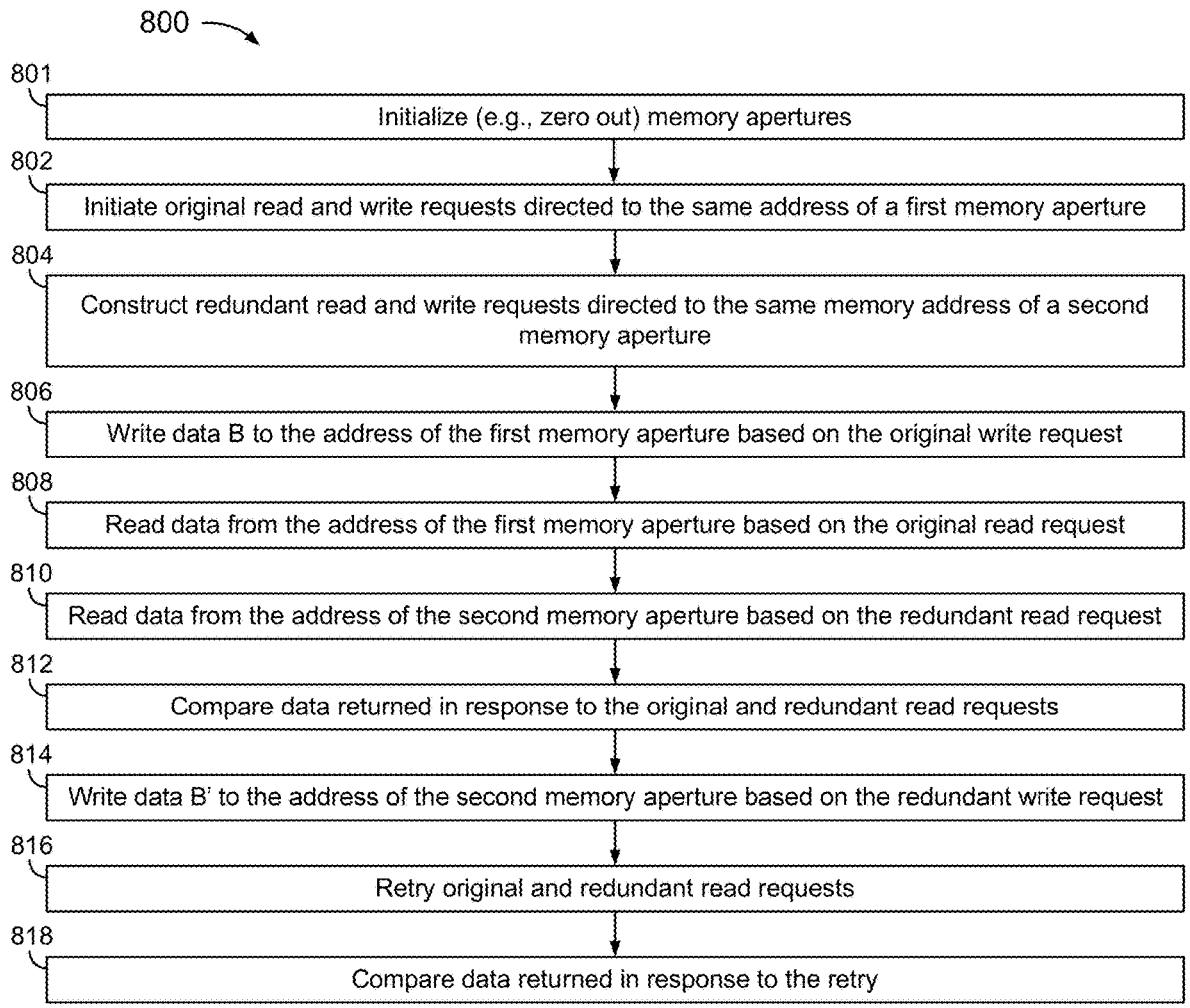
FIG. 8 is a flowchart of a method of recovering from a data consistency issue, according to an embodiment.

FIG. 8 is a flowchart of a method 800 of recovering from a data consistency issue, according to an embodiment. Method 800 is described below with reference to FIG. 7. Method 800 is not, however, limited to the example of FIG. 7.

At 801, memory subsystem 104 initializes memory apertures 110 and 112, so that contents of memory aperture 110 are identical to contents of memory aperture 112. For illustrative purposes, initial contents of addresses 740 and 742 are referred to herein as data A and redundant data A', respectively, where data A and data A' are identical to one another.

At 802, originator circuit 102 initiates an original read request 750 directed to address 740, and originator circuit 702 initiates an original write request 752 containing data B, also directed to address 740. Originator circuits 102 and 702 may issue requests 750 and 752 at nearly or substantially the same time.

At 804, redundant transaction generator circuitry 116 constructs a redundant read request 754 directed to address 742, and redundant transaction generator circuitry 716 constructs a redundant write request 756, also directed to address 742, containing a copy of data B, referred to herein as data B'.

At 806, memory subsystem 104 writes data B to address 740 (i.e., overwrites data A) based on original write request 752, and returns a response 758 to transaction redundancy circuitry 714. Response 758 may include an acknowledgement indication that confirms that the write operation completed successfully.

At 808, memory subsystem 104 reads data B from address 740 based on original read request 750, and returns a response 760 to transaction redundancy circuitry 114. Response 760 contains data B read from address 740 and may further include an acknowledgement indication that confirms that the read operation completed successfully.

At 810, memory subsystem 104 reads address 742 based on redundant read request 754, prior to memory subsystem 104 writing data B' to memory address 742. In this situation, memory subsystem 104 returns a response 762 to transaction redundancy circuitry 114 that contains data A. Response 762 may also include acknowledgement indication confirming that the read operation was successful.

At 812, redundant transaction management circuitry 118 compares the data sets of responses 760 and 762. Since response 760 contains data B and response 762 contains data A', redundant transaction management circuitry 118 declares a data mismatch and initiates a retry of original read request 750 and redundant read request 754.

At 814, memory subsystem 104 writes data B' to address 742 (La, overwrites data A') based on redundant write request 756. Memory subsystem 104 returns a response 764 to transaction redundancy circuitry 714. Response 764 may include an acknowledgement indication that confirms that the redundant write operation completed successfully.

At 816, memory subsystem 104 re-reads addresses 740 and 742 based on the retry initiated at 814, and returns corresponding updated versions of responses 760 and 762 to transaction redundancy circuitry 114. The updated version of responses 760 contain data B, as at 810. The updated version of responses 762 now contain data B. The updated versions of responses 760 and 762 may also contain respective acknowledgment indications.

At 818, redundant transaction management circuitry 118 compares the data sets returned in the updated versions of responses 760 and 762. Since the updated version of response 760 contains data B and the updated version of response 762 now contains data IT, redundant transaction management circuitry 118 determines that the data sets match, and returns the updated version of responses 760 and/or 762 to originator circuit 102 as response 126.

Additional features of FIG. 4 are described below.

In an embodiment, transaction redundancy circuitry 114 limits allowable data patterns returned from memory apertures 110 and 112 in response to a retry operation. For example, suppose memory apertures 110 and 112 return data X and Y, respectively, in response to read requests 420 and 424, wherein X and Y differ from one another. On retry, transaction redundancy circuitry 114 may generate and error and/or interrupt unless apertures 110 and 112 return X and X or Y and Y, respectively.

Retry manager 434 may permit one or more retries per transaction. In an embodiment, retry manager 434 permits a predetermined number of retries per transaction. In another embodiment, retry manager 434 permits as many retry transactions may be issued as required by a transaction originator or application. If a number of retry transactions reaches or exceeds a threshold number of retry transactions, retry manager 434 may initiate an error response and/or an interrupt.

If a subsequent mismatch occurs while a prior retry is in progress, retry manager 434 may stall a subsequent retry until completion of the prior retry.

When a retry is initiated, transaction redundancy circuitry 114 may update a state of the transaction so that all outstanding responses are discarded, and may reset any related responses that have already been received.

In an embodiment, transaction redundancy circuitry 114 indexes entries of RD response buffer 426 by an identifier of an original transaction (e.g., read request 420) and an identifier of a corresponding redundant transaction (e.g., redundant read request 424). Transaction redundancy circuitry 114 may associate each pair of identifiers with N data buffers (one per response), where N is an integer.

Transaction redundancy circuitry 114 may assign state bits to the entries. The state bits may include a valid or "V" bit that indicates that the data is valid. The state bits may further include a current or "C" bit that indicates which data word is to be compared. State bits may be useful where data word is read or returned in sections or flits, such as described below with reference to FIGS. 9A-9E.

FIGS. 9A-9E are conceptual illustrations of RD response buffer 426 as responses 430 and 432 are received, according to an embodiment. In the example of FIGS. 9A-94, RD response buffer 426 has two entries 902 and 904.

In FIG. 9A, when RD REQ manager 422 outputs read requests 420 and 424, RD response buffer 426 populates entry 902 with an original ID 906 of read request 420 and a redundant ID 908 of read request 424, and sets the valid bit V of entry 902.

In FIG. 9B, data field 910 of entry 902 is populated with a first portion of data (illustrated here as A0 data) returned in an initial response 430 from memory aperture 110 based on read request 420. Current bit C of entry 902 is set.

In FIG. 9C, data field 910 of entry 904 is populated with a second portion of data (illustrated here as A1 data) returned in a subsequent response 430 from memory aperture 110 based on read request 420, and valid bit V of entry 904 is set. In this example, A0 and A1 are flits of the same transaction, and B0 and B1 are two flits of the respective redundant transaction.

In FIG. 9D, data field 910 of entry 902 is further populated with a first portion of data (illustrated here as B0 data) returned in an initial response 432 from memory aperture 112 based on redundant read request 424. Current bit C of entry 902 is cleared, indicating that transaction redundancy circuitry 114 compared A0 data and B0 data to one another, and current bit C of entry 904 is set.

In FIG. 9E, data field 910 of entry 904 is further populated with a second portion of data (illustrated here as B1 data) returned in a subsequent response 432 from memory aperture 112 based on redundant read request 424. Current bit C of entry 904 is cleared, indicating that transaction redundancy circuitry 114 compared A1 data and B1 data to one another.

As an example, and without limitation, data words (e.g., A0 plus A1 data) are 128 bits, and original ID 906 and redundant ID 908 are 16 bits.

For write transaction, where a single response is expect from each memory aperture, WR response buffer 414 may include a single entry having fields for original and redundant transaction identifiers, a valid bit "V" and a current bit "C." The single entry does not need to include a data field.

In an embodiment, IC system 100 selectively invokes or utilizes transaction redundancy circuitry 114 to provide transaction redundancy, referred to herein as a mixed criticality or selective-bypass embodiment. IC system 100 may, for example, include circuitry that invokes transaction redundancy circuitry 114 if the destination address of memory access request 108 corresponds to memory aperture 110 (i.e., if the destination address falls within an address range of memory aperture 110), As another example, IC system 100 may include circuitry that invokes transaction redundancy circuitry 114 if an identifier of memory access request 108 matches an identifier contained within a list of identifiers authorized to access memory aperture 110. In an embodiment, REQ CAM 436 (FIG. 4) uses an additional bit to indicate whether a read request stored in REQ CAM 436 at 606 in FIG. 6, is to be duplicated. When a response to the read request is received, the bit may be checked to determine whether to wait for an additional response.

In an embodiment, transaction redundancy circuitry 114 is configurable (e.g., at boot-time), so that all memory access requests bypass transaction redundancy circuitry 114 (i.e., to effectively disable transaction redundancy).

In an embodiment, any number of redundant memory apertures may be used. As an example, 4 memory apertures may be used. Each aperture may have a base address and size and the base address of the redundant region. The address aperture may be disabled/enabled with register control.

In an embodiment, one or more data paths and/or memory components of IC system 100 are parity protected. For example, and without limitation, read data held in RD response buffer 426 (FIG. 4) may be parity protected. Since read data is duplicated by construction, redundancy is implicit. A timeout mechanism may be used to detect whether the read data is faithfully presented to the system.

In an embodiment, a combination of timeout and redundancy is used to achieve a desired ASIL-D levels of protection.

In an embodiment, transaction redundancy circuitry 114 and/or other circuitry detects the existence of an error without necessarily determining a particular source of the error. To this end, transaction redundancy circuitry 114 and/or other circuitry compares data/requests at edges, and flags an error upon a mismatch. Transaction redundancy circuitry 114 and/or other circuitry may rely on timeouts generated by other aspects of IC system 100, such as originator circuit 102, for transactions that do not complete. In other words, in an embodiment, transaction redundancy circuitry 114 does not include an explicit timeout mechanisms. In other embodiments, transaction redundancy circuitry 114 may include a timeout mechanism.

In an embodiment, read and write requests are processed in-order.

In an embodiment, read and write requests are processed on separate channels.

IC system may include transaction request comparison circuitry, such as described below with respect to FIG. 10.

Figure 10:
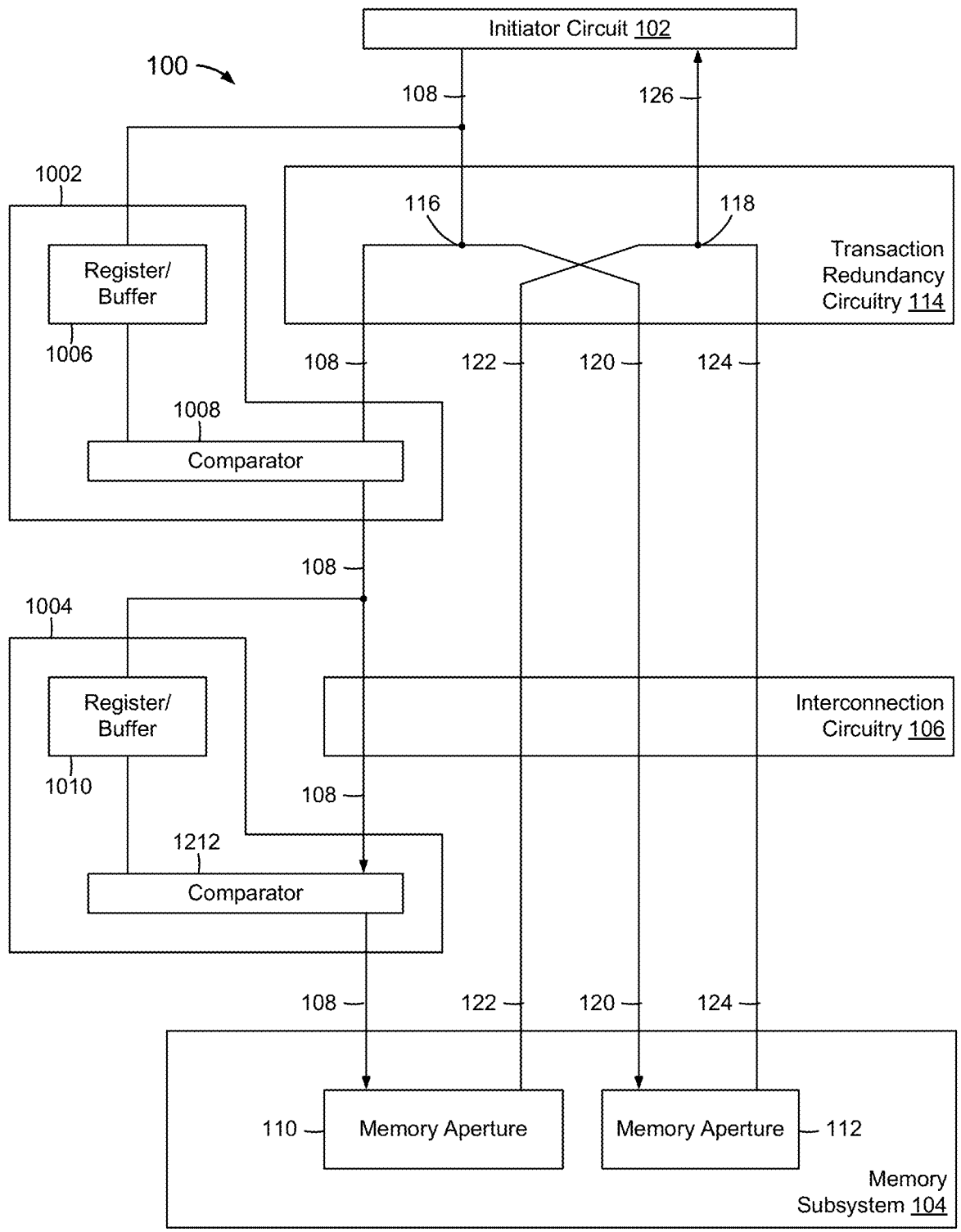
FIG. 10 is a block diagram of the IC system, further including request comparison circuitry, according to an embodiment.

FIG. 10 is a block diagram of IC system 100, further including request comparison circuitry 1002 and 1004, according to an embodiment. Request comparison circuitry 1002 includes a register or buffer (register) 1006 that holds a copy of memory access request 108 while memory access request 108 traverses transaction redundancy circuitry 114. Request comparison circuitry 1002 further includes a comparator 1008 that compares contents of register 1006 with memory access request 108 after memory access request 108 traverses transaction redundancy circuitry 114 (i.e., when memory access request 108 appears at an output of transaction redundancy circuitry 114). If there is a mismatch, request comparison circuitry 1002 generates an error indication and/or an interrupt.

Request comparison circuitry 1004 includes a register or buffer (register) 1010 that holds a copy of memory access request 108 while memory access request 108 traverses interconnection circuitry 106, or a portion thereof. Request comparison circuitry 1004 further includes a comparator 1012 that compares contents of register 1010 with memory access request 108 after memory access request 108 traverses transaction redundancy circuitry 114 (i.e., when memory access request 108 appears at an output of interconnection circuitry 106). If there is a mismatch, request comparison circuitry 1004 generates an error indication and/or an interrupt.

Request comparison circuitry may be dispersed throughout IC system 100.

In an embodiment, redundant comparison circuitry is not provided along a path of redundant memory access request 120 because any error in the path of redundant memory access request 120 will show up as timeout and/or an error in a subsequent read operation.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure, Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. An integrated circuit (IC) system, comprising:
   transaction redundancy circuitry configured to,
      receive a first memory access request from an originator circuit, wherein a destination address of the first memory access request corresponds to a first memory aperture,
      construct a second memory access request that is redundant to the first memory access request, and provide the second memory access request with a destination address that corresponds to a second memory aperture,
      receive responses to the first and second memory access requests from the respective first and second memory apertures, and
      selectively return one or more of the responses to the originator circuit based on contents of the responses.

2. The IC system of claim 1, further comprising:
   the originator circuit;
   the first and second memory apertures; and
   interconnection circuitry configured to interface between the originator circuit and each of the first and second memory apertures.

3. The IC system of claim 1, wherein the first memory access request comprises a read request, and wherein the transaction redundancy circuitry is further configured to:
   retry the first and second memory access requests if data sets contained in the responses do not match one another.

4. The IC system of claim 3, wherein the transaction redundancy circuitry comprises:
   content addressable memory configured to hold the first memory access request, indexed by an identifier associated with the first memory access request; and
   retry management circuitry configured to initiate the retry of the first and second memory access requests based on the first memory access request held in the content addressable memory.

5. The IC system of claim 3, wherein the transaction redundancy circuitry comprises:
   arbitration circuitry configured to arbitrate between the retry of the first memory access request and one or more other memory access requests of the originator circuit.

6. The IC system of claim 1, wherein the first memory access request comprises a read request, wherein the responses comprise respective read acknowledgement indicators and data sets, and wherein the transaction redundancy circuitry is further configured to:
   selectively return the one or more responses by returning one of the read acknowledgement indicators and one of the data sets to the originator circuit if the read acknowledgement indicators indicate successful read operations and the data sets match one another;
   retry the first and second memory access requests if the read acknowledgement indicators indicate successful read operations and the data sets do not match one another; and
   generate an error indication if any of the read acknowledgement indicators indicates an unsuccessful read operation.

7. The IC system of claim 1, wherein the first memory access request comprises a write request, wherein the one or more responses comprise write acknowledgement indicators, and wherein the transaction redundancy circuitry is further configured to selectively return the one or more responses by:
   returning one of the write acknowledgement indicators to the originator circuit if the write acknowledgement indicators indicate successful write operations; and
   generate an error indication if any of the write acknowledgement indicators indicates an unsuccessful write operation.

8. The IC system of claim 1, wherein the transaction redundancy circuitry is further configured to:
   assign an identifier to the second memory access request based on an identifier assigned to the first memory access request.

9. The IC system of claim 1, the transaction redundancy circuitry is further configured to:
   selectively construct the second memory access request based on an identifier of the first memory access request and/or the destination address of the first memory access request.

10. The IC system of claim 1, further comprising:
    request comparison circuitry configured to compare instances of the original memory access request at multiple nodes of the IC system.

11. A system-on-a-chip (SoC), comprising:
    first and second memory apertures;
    an originator circuit configured to generate a first memory access request, wherein a destination address of the first memory access request corresponds to the first memory aperture;
    interconnection circuitry configured to interface between the originator circuit and each of the first and second memory apertures; and
    transaction redundancy circuitry configured to,
       construct a second memory access request that is redundant to the first memory access request, and provide the second memory access request with a destination address that corresponds to the second memory aperture, receive responses to the first and second memory access requests from the respective first and second memory apertures, and selectively return one or more of the responses to the originator circuit based on contents of the responses.

12. The SoC of claim 11, wherein the first memory access request comprises a read request, and wherein the transaction redundancy circuitry is further configured to:

retry the first and second memory access requests if data sets contained in the responses do not match one another.

13. The SoC of claim 12, wherein the transaction redundancy circuitry comprises:

content addressable memory configured to hold the first memory access request, indexed by an identifier associated with the first memory access request; and retry management circuitry configured to initiate the retry of the first and second memory access requests based on the first memory access request held in the content addressable memory.

14. The SoC of claim 11, wherein the first memory access request comprises a read request, wherein the responses comprise respective read acknowledgement indicators and data sets, and wherein the transaction redundancy circuitry is further configured to selectively return the one or more responses by:

returning one of the read acknowledgement indicators and one of the data sets to the originator circuit if the read acknowledgement indicators indicate successful read operations and the data sets match one another;

retrying the first and second memory access requests if the read acknowledgement indicators indicate successful read operations and the data sets do not match one another; and generating an error indication if any of the read acknowledgement indicators indicates an unsuccessful read operation.

15. The SoC of claim 11, wherein the first memory access request comprises a write request, wherein the responses comprise write acknowledgement indicators, and wherein the transaction redundancy circuitry is further configured to selectively return the one or more responses by:

returning one of the write acknowledgement indicators to the originator circuit if the write acknowledgement indicators indicate successful write operations; and declaring an error if any of the write acknowledgement indicators indicates an unsuccessful write operation.

16. The SoC of claim 11, further comprising circuitry configured to:

selectively construct the second memory access request based on an identifier of the first memory access request and/or the destination address of the first memory access request.

17. A method, comprising:

receiving a first memory access request from an originator circuit, wherein a destination address of the first memory access request corresponds to a first memory aperture;

constructing a second memory access request that is redundant to the first memory access request, and providing the second memory access request with a destination address that corresponds to a second memory aperture;

receiving responses to the first and second memory access requests from the respective first and second memory apertures; and selectively returning one or more of the responses to the originator circuit based on contents of the responses.

18. The method of claim 17, wherein the first memory access request comprises a read request, the method further comprising:

retrying the first and second memory access requests if data sets contained in the responses do not match one another.

19. The method of claim 17, wherein the first memory access request comprises a read request, wherein the responses comprise respective read acknowledgement indicators and data sets, wherein the selectively returning comprises returning one of the read acknowledgement indicators and one of the data sets to the originator circuit if the read acknowledgement indicators indicate successful read operations and the data sets match one another, and wherein the method further comprises:

retrying the first and second memory access requests if the read acknowledgement indicators indicate successful read operations and the data sets do not match one another; and generating an error indication if any of the read acknowledgement indicators indicates an unsuccessful read operation.

20. The method of claim 17, further comprising:

selectively constructing the second memory access request based on one or more of an identifier of the first memory access request the destination address of the first memory access request.

* * * * *